United States Patent
Griffin, Jr. et al.

(10) Patent No.: US 9,790,972 B2
(45) Date of Patent: Oct. 17, 2017

(54) HEATED FLUID REGULATORS

(71) Applicant: Emerson Process Management Regulator Technologies, Inc., McKinney, TX (US)

(72) Inventors: James Lyman Griffin, Jr., McKinney, TX (US); Harold Joe McKinney, Durant, OK (US)

(73) Assignee: Emerson Process Management Regulator Technologies, Inc., McKinney, TX (US)

( * ) Notice: Subject to any disclaimer, the term of this patent is extended or adjusted under 35 U.S.C. 154(b) by 178 days.

(21) Appl. No.: 13/926,687

(22) Filed: Jun. 25, 2013

(65) Prior Publication Data

US 2014/0373951 A1    Dec. 25, 2014

(51) Int. Cl.
| | | |
|---|---|---|
| *F15C 1/16* | (2006.01) | |
| *F25B 9/04* | (2006.01) | |
| *F15D 1/00* | (2006.01) | |
| *G05D 16/00* | (2006.01) | |
| *G05D 7/00* | (2006.01) | |

(Continued)

(52) U.S. Cl.
CPC ....... *F15D 1/0015* (2013.01); *G05D 16/0655* (2013.01); *Y10T 137/2087* (2015.04); *Y10T 137/2098* (2015.04); *Y10T 137/2104* (2015.04); *Y10T 137/2109* (2015.04); *Y10T 137/2115* (2015.04); *Y10T 137/87249* (2015.04); *Y10T 137/87378* (2015.04)

(58) Field of Classification Search
CPC ....... F15D 1/0015; F15D 1/008; G05D 16/00; G05D 16/06; G05D 7/00; G05D 7/0106; G05D 7/0126; G05D 7/0133; G05D 16/0655; F25B 9/04; Y10T 137/2087; Y10T 137/2109; Y10T 137/2115; Y10T 137/87378; Y10T 137/2098; Y10T 137/2104; Y10T 137/87249
USPC ................ 137/808, 810, 811, 812, 813, 597, 137/599.16, 625.33
See application file for complete search history.

(56) References Cited

U.S. PATENT DOCUMENTS

| | | |
|---|---|---|
| 1,952,281 A | 3/1934 | Ranque |
| 2,737,028 A | 3/1956 | Machlanski |

(Continued)

FOREIGN PATENT DOCUMENTS

| | | |
|---|---|---|
| DE | 2130601 | 1/1973 |
| FR | 2759146 | 8/1998 |

OTHER PUBLICATIONS

Patent Cooperation Treaty, "Search Report," issued in connection with International Application no. PCT/US2015/051810, on Dec. 3, 2015, 6 pages.

(Continued)

*Primary Examiner* — Kevin Murphy
*Assistant Examiner* — Kelsey Rohman
(74) *Attorney, Agent, or Firm* — Hanley, Flight & Zimmerman, LLC

(57) ABSTRACT

Example apparatus for regulator heat transfer are disclosed. An example apparatus includes a regulator including a body, a stem disposed therein, a first inlet and a first outlet. The regulator regulates a pressure of a fluid flowing from the first inlet to the first outlet. The example apparatus comprises a vortex generator disposed within the body to convey heat to a valve of the regulator. The stem controls the regulator and the vortex generator.

21 Claims, 6 Drawing Sheets

(51) Int. Cl.
*G05D 7/01* (2006.01)
*G05D 16/06* (2006.01)

(56) References Cited

U.S. PATENT DOCUMENTS

| | | | |
|---|---|---|---|
| 2,749,925 | A | 6/1956 | Long |
| 3,019,621 | A | 2/1962 | Lawson |
| 3,165,149 | A | 1/1965 | Raible et al. |
| 3,285,055 | A | 11/1966 | Reinecke |
| 3,307,366 | A | 3/1967 | Smith |
| 3,684,237 | A * | 8/1972 | Hyde et al. ............... 251/58 |
| 4,112,977 | A * | 9/1978 | Syred et al. ............... 137/812 |
| 4,132,247 | A * | 1/1979 | Lindberg ............ F02M 19/03 123/25 E |
| 4,232,657 | A | 11/1980 | Killorin |
| 4,877,059 | A * | 10/1989 | Popescu ................ F16K 31/02 137/554 |
| 5,322,043 | A * | 6/1994 | Shriner et al. ............... 123/295 |
| 5,327,728 | A | 7/1994 | Tunkel |
| 5,335,503 | A | 8/1994 | Lee |
| 5,582,012 | A | 12/1996 | Tunkel et al. |
| 5,603,746 | A | 2/1997 | Sharan |
| 5,682,749 | A | 11/1997 | Bristow et al. |
| 6,082,116 | A | 7/2000 | Tunkel et al. |
| 6,156,114 | A | 12/2000 | Bell et al. |
| RE37,922 | E | 12/2002 | Sharan |
| 7,234,489 | B2 * | 6/2007 | Bowe et al. ............... 137/813 |
| 9,599,372 | B2 | 3/2017 | Bancroft et al. |
| 2004/0216785 | A1 | 11/2004 | Bowe et al. |
| 2005/0045033 | A1 | 3/2005 | Nicol et al. |
| 2008/0060708 | A1 * | 3/2008 | Benda ................ F16K 11/10 137/625.33 |
| 2008/0115507 | A1 | 5/2008 | Blomkvist |
| 2011/0120677 | A1 | 5/2011 | Oh et al. |
| 2011/0186300 | A1 | 8/2011 | Dykstra et al. |
| 2013/0174551 | A1 | 7/2013 | Mahmoud et al. |
| 2015/0027507 | A1 | 1/2015 | Noui-Mehidi |
| 2016/0085244 | A1 | 3/2016 | Jackson et al. |

OTHER PUBLICATIONS

Patent Cooperation Treaty, "Written Opinion," issued in connection with International Application No. PCT/US2015/051810, on Dec. 3, 2015, 7 pages.

United States Patent and Trademark Office, "Non-Final Office Action," issued in connection with U.S. Appl. No. 14/495,568, on Apr. 29, 2016, 9 pages.

Fisher Controls, "Hilsch Vortex Tube," Bulletin K-8B (1956), 2 pages.

Gas Research Institute, "Vortex Tube Experiment Final Report," GRI-03/0171 (Oct. 2003), 154 pages.

Patent Cooperation Treaty, "International Search Report of the International Searching Authority," issued in connection with international application No. PCT/US2015/051816, on Jan. 27, 2016, 3 pages.

Patent Cooperation Treaty, "Written Opinion of the International Searching Authority," issued in connection with international application No. PCT/US2015/051816, on Jan. 27, 2016, 6 pages.

United States Patent and Trademark Office, "Requirement for Restriction/Election," issued in connection with U.S. Appl. No. 14/495,579, on Jul. 26, 2016 (8 pages).

United States Patent and Trademark Office, "Office Action," issued in connection with U.S. Appl. No. 14/495,579, on Oct. 18, 2016 (13 pages).

Patent Cooperation Treaty, "Notification of Transmittal of the International Search Report and the Written Opinion of the International Searching Authority," issued in connection with international application No. PCT/US2014/044011, on Sep. 12, 2014, 9 pages.

Patent Cooperation Treaty, "International Preliminary Report on Patentability," issued in connection with international application No. PCT/US2014/044011, on Dec. 29, 2015, 6 pages.

United States Patent and Trademark Office, "Non-final Office Action," issued in connection with U.S. Appl. No. 14/495,568, dated Dec. 1, 2016, 24 pages.

United States Patent and Trademark Office, "Final Office Action," issued in connection with U.S. Appl. No. 14/495,597 dated May 5, 2017, 46 pages.

United States Patent and Trademark Office, "Non-final Office Action," issued in connection with U.S. Appl. No. 14/495,568, dated Jul. 6, 2017, 21 pages.

State Intellectual Property Office of People's Republic of China, "First Office Action," issued in connection with Chinese Patent Application 201410281310.5, dated Jun. 2, 2017, 13 pages.

State Intellectual Property Office of People's Republic of China, "Search Report," issued in connection with Chinese Patent Application 201410281310.5, dated May 24, 2017, 2 pages.

United States Patent and Trademark Office, "Advisory Action," issued in connection with U.S. Appl. No. 14/495,579, dated Aug. 18, 2017, 13 pages.

* cited by examiner

HEATED FLUID REGULATORS

FIELD OF THE DISCLOSURE

This disclosure relates generally to fluid regulators and, more particularly, to heated fluid regulators.

BACKGROUND

Fluid regulators may experience icing from hydrates at a point of pressure reduction. In some cases, this icing may occur at temperatures above freezing. Ice may build up in the regulator, thereby hindering performance of the regulator.

Figure 1:
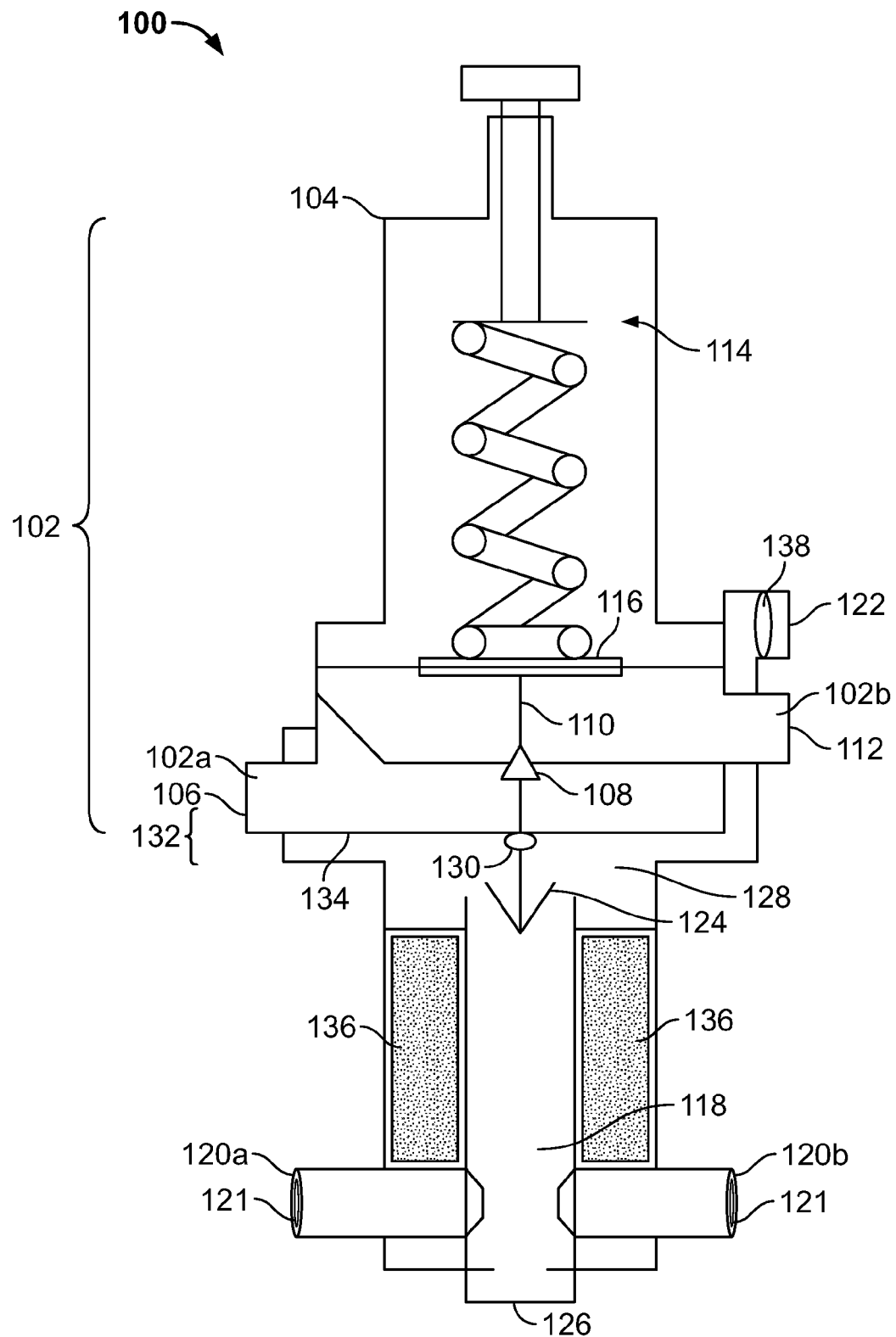
FIG. 1 is a schematic view of a first apparatus according to one or more aspects of the present disclosure.

The figures are not to scale. Instead, to clarify multiple layers and regions, the thickness of the layers may be enlarged in the drawings. Wherever possible, the same reference numbers will be used throughout the drawing(s) and accompanying written description to refer to the same or like parts. As used in this patent, stating that any part (e.g., a layer, film, area, or plate) is in any way positioned on (e.g., positioned on, located on, disposed on, or formed on, etc.) another part, means that the referenced part is either in contact with the other part, or that the referenced part is above the other part with one or more intermediate part(s) located therebetween. Stating that any part is in contact with another part means that there is no intermediate part between the two parts.

SUMMARY

Heated fluid regulators are disclosed. An example apparatus includes a regulator including a body, a stem disposed therein, a first inlet and a first outlet. The regulator regulates a pressure of a fluid flowing from the first inlet to the first outlet. The example apparatus comprises a vortex generator disposed within the body to convey heat to a valve of the regulator. The stem controls the regulator and the vortex generator.

Another example apparatus includes a body having an inlet and an outlet and a stem disposed therein, a vortex generator disposed within the body to heat a fluid flowing from the inlet to the outlet, and a first valve to regulate pressure of the fluid. The stem controls the first valve and the vortex generator.

Another example apparatus includes means for regulating pressure and means for heating the means for regulating pressure, the means for regulating pressure and the means for heating comprising one body.

DETAILED DESCRIPTION

The example apparatus disclosed herein relate to heated fluid regulators. More specifically, the examples described herein may be used to provide heat to a fluid regulator without requiring external heating sources. In particular, the examples described herein employ a vortex generator within a body of the regulator, where the vortex generator is to convey heat to the regulator to prevent icing within the regulator.

Hydrates, or a frozen mixture of water and hydrocarbons, form when, for example, water and natural gas are in contact at low temperatures and under high pressure. Additional factors that may contribute to hydrate formation include, for example, high fluid velocities, fluid agitation, pressure pulsations, and the presence of carbon dioxide and/or hydrogen sulfide. Icing due to hydrates may result as a hydrocarbon fluid containing, for example, water and carbon dioxide, flows through a regulator. When the pressure of the fluid is reduced in accordance with the operation of the regulator, the temperature of the fluid is also reduced according to the Joule-Thomson effect. As a result of the temperature drop, any moisture in the fluid stream may result in the formation of hydrates. Hydrates may form, for example, at a point of pressure reduction in the regulator, such as at a valve of the regulator.

A build-up of, for example, hydrates in the regulator may hinder the performance of the regulator. For example, a build-up of hydrates at the regulator valve may prevent the regulator valve from closing or opening properly, thereby affecting the ability of the regulator to control the pressure of the fluid in response to varying demand on the regulator. Icing in the regulator may further impede the fluid output of the regulator by, for example, clogging the regulator outlet.

While some known applications of regulators involving fluids that may form hydrates have included heat sources to reduce instances of icing, such heat sources are typically additional devices that are mounted external to a body of the regulator. One such external heat source is a vortex generator. Vortex generators produce heat by rotating a compressed fluid (e.g., compressed air) through, for example, a tube, at high speeds to generate a vortex. The resulting vortex includes a hot fluid stream, a portion of which may exit through an outlet of the vortex generator. A remaining portion of the vortex fluid is forced back down the tube of the vortex generator at a slower rate so that heat in the slower moving fluid is transferred to the faster moving incoming fluid. This transfer of heat results in a cold fluid stream that exits the vortex tube at an outlet opposite the outlet of the hot fluid stream. The flow of the hot fluid stream and the flow of the cold fluid stream through the respective outlets may be regulated by valves.

In accordance the teachings disclosed herein, a vortex generator and a regulator are disposed within a regulator body. A hot fluid stream is generated by the vortex generator and exits through an outlet disposed proximate to a valve of the regulator to provide heat to the regulator valve to prevent icing during operation of the regulator. Specifically, the heat generated by the vortex generator and transferred to the regulator valve may prevent icing due to the formation of hydrates at the point of pressure reduction within the regulator. In some examples, heat may be transferred to the regulator valve via, for example, conduction, fluid mixing, and/or via a fluid flowing serially through the vortex generator and the regulator. Further, a two-seat, single stem valve design provides for concurrent control of the regulator and the vortex generator in the regulator body.

Turning now to the figures, FIG. 1 depicts an example apparatus 100 including a regulator 102 having a first regulator chamber 102a and a second regulator chamber 102b disposed in a regulator body 104. A process fluid, for example, natural gas or compressed air, enters a process fluid inlet 106 and flows into the first regulator chamber 102a. A regulator valve 108 is disposed between the regulator chambers 102a, 102b to regulate a pressure of the process fluid flowing through the regulator 102.

The regulator valve 108 is controlled by a stem 110 disposed in the regulator body 104. The stem 110 opens and closes the regulator valve 108 to provide a substantially constant output pressure of the process fluid at a regulator outlet 112. The stem 110 controls the regulator valve 108 in response to a force generated by a loading mechanism 114 and detected by a sensing element 116. The stem 110 is communicatively connected to the sensing element 116 and displacement of the sensing element 116 due to a force generated by the loading mechanism 114 causes the stem 110 to open the regulator valve 108. In the apparatus 100, the loading mechanism 114 includes a spring and the sensing element 116 is a diaphragm. In some examples, the regulator 102 is a pressure-loaded or dome-loaded regulator or a weight-loaded regulator. In further examples, the loading mechanism 114 includes a combination of spring loading, dome loading, and/or weights. The sensing element 116 may comprise, for example, an elastomeric material, pistons, or bellows.

Additionally, a vortex tube 118 is disposed in the regulator body 104. An input fluid enters the vortex tube 118 through vortex tube inlets 120a, 120b. Although FIG. 1 shows the apparatus 100 having two vortex tube inlets 120a, 120b, the apparatus 100 may have fewer or more vortex tube inlets. Further, the input fluid may be the same fluid as the process fluid entering the process fluid inlet 106 of the regulator 102 or a different fluid than the process fluid.

The vortex tube inlets 120a, 120b include nozzles 121 to spin the input fluid to generate a vortex as the input fluid flows into the vortex tube inlets 120a, 120b. In some examples, the nozzles 121 comprise tangential inlets or inlets having an Archimedes spiral shape. The nozzles 121 may comprise one or more inlets to spin the input fluid. Spinning the input fluid as the input fluid enters the vortex tube inlets 120a, 120b through nozzles 121 increases the tangential velocity of the input fluid as the input fluid flows from the vortex tube inlets 120a, 120b to the vortex tube 118 and generates a vortex.

The input fluid travels through the vortex tube 118 in a vortical flow including a first fluid stream or portion of the input fluid and a second fluid stream or portion of the input fluid. The first fluid stream has a higher temperature than the second fluid stream, such that the first fluid stream is a relatively hot fluid stream and the second fluid stream is a relatively cold fluid stream. As an example of the operation of the vortex tube 118, a vortex is created by spinning the input fluid. This vortex may be considered a primary vortex consisting of the first fluid stream. The first fluid stream flows toward a first end of the vortex tube 118, where a portion of the first fluid stream exits the vortex tube 118. The remainder of the first fluid stream, or the second fluid stream, flows toward a second end of the vortex tube 118. The second fluid stream travels as a secondary vortex inside a low-pressure area of the primary vortex. The first fluid stream and the second fluid stream flow in counter directions toward the first end and the second end of the vortex tube 118, respectively, while rotating in the same direction at the same angular velocity. Angular momentum is lost from the secondary vortex to the primary vortex. This loss of energy results in a temperature difference between the first fluid stream and the second fluid stream such that the temperature of the first fluid stream is increased as compared to the temperature of the second fluid stream.

For example, the temperature of the hot fluid stream may be about 120° F. greater than the temperature of the input fluid entering the vortex tube inlets 120a, 120b. The temperature difference between the hot fluid stream and the input fluid may be greater or less than 120° F. When the temperature difference between the hot fluid stream and the input fluid is about 120° F., the temperature difference between the cold fluid stream and the input fluid is about 60° F. In such examples, the temperature of the cold fluid stream is about 60° F. less than the temperature of the input fluid. The temperature difference between the hot fluid stream and/or the cold fluid stream with respect to the input fluid is related to output flows of the hot fluid stream and the cold fluid stream from the vortex tube 118, as will be discussed further herein.

In the apparatus 100, the hot fluid stream flows through the vortex tube 118 and exits the apparatus 100 via a hot fluid outlet 122. Additionally, a vortex tube valve 124 is disposed in the vortex tube 118 such that the hot fluid stream flows across the vortex tube valve 124 before exiting the apparatus 100 via the hot fluid outlet 122. The cold fluid stream exits the vortex tube 118 through a cold fluid outlet 126 opposite the hot fluid outlet 122. In some examples, a second vortex tube valve is disposed in the cold fluid outlet 126 to control the output of the cold fluid stream.

As the stem 110 controls or adjusts the regulator valve 108 to regulate the pressure of the process fluid flowing through the regulator 102, the stem 110 also controls or adjusts the vortex tube valve 124 to provide heat to the regulator valve 108 relative to a demand on the regulator 102. In jointly controlling the regulator valve 108 and the vortex tube valve 124 in the regulator body 104, the single stem 110 controls the regulator valve 108 to maintain a constant output pressure of the process fluid exiting the regulator 102 via the regulator outlet 112. The stem 110 also controls the vortex tube valve 124 to transfer heat from the hot fluid stream to the regulator valve 108. Further, the stem 110 controls the vortex tube valve 124 such that the temperature difference between the hot fluid stream and the input fluid entering the vortex tube 118 is maximized relative to a pressure reduction of the process fluid at the regulator valve 108.

To maintain a constant pressure output of the process fluid exiting the regulator 102 via the regulator outlet 112, the stem 110 adjusts the position of the regulator valve 108 in response to the behavior of the loading mechanism 114 and the sensing element 116. The stem 110 opens the regulator valve 108 to increase an amount of flow of the process fluid through the regulator 102 when the sensing element 116 is displaced due to a force generated by the loading mechanism 114 that is greater than a force corresponding to the process fluid in the second regulator chamber 102b. The stem 110 closes the regulator valve 108 to restrict flow of the process fluid through the regulator 102 when the force from the loading mechanism 114 against the sensing element 116 is less than the force corresponding to the process fluid in the second regulator chamber 102b. The stem 110 controls the regulator valve 108 to maintain a constant output pressure at the regulator outlet 112 as defined by the loading mechanism 114.

To provide heat to the regulator valve 108, the input fluid enters the vortex tube 118 via the vortex tube inlets 120a, 120b and a vortex is generated in the vortex tube 118. The vortex includes the hot fluid stream, which has a temperature that is higher than a temperature of the input fluid at the vortex tube inlets 120a, 120b. When the regulator valve 108 is open, the stem 110 positions the vortex tube valve 124 such that a portion of the hot fluid stream exits the vortex tube valve 124. Upon passing through the vortex tube valve 124, the hot fluid stream enters an expansion chamber 128 disposed in the regulator body 104 and positioned between the vortex tube 118 and the hot fluid outlet 122. In the apparatus 100 shown in FIG. 1, the expansion chamber 128 is disposed in the regulator body 104 proximate to the first regulator chamber 102a.

A seal 130 is disposed between the regulator 102 and the expansion chamber 128. The seal 130 prevents mixing of the process fluid flowing through the first regulator chamber 102a with the input fluid flowing through the vortex tube 118. The seal 130 may comprise an elastomeric material to permit the stem 110 to slide between the regulator 102 and the vortex tube 118 to control the opening and closing the regulator valve 108 and the vortex tube valve 124. For example, the seal 130 may comprise an elastomeric O-ring.

As the hot fluid stream flows into the expansion chamber 128, heat is transferred from the hot fluid stream to the process fluid in the first regulator chamber 102a. In the example apparatus 100, the heat is transferred via conduction. In particular, the heat is transferred through an area of contact 132 between the regulator 102 and the expansion chamber 128. The area of contact 132 includes a surface 134 of the regulator 102. The surface 134 includes a thermally conductive material, such as a metal having a high heat transfer coefficient. In some examples, the surface 134 includes fins to increase the surface area of the surface 134 and thereby increase a rate of heat transfer. As heat is conducted through the surface 134 to the process fluid flowing through the first regulator chamber 102a, the process fluid is heated. As the heated process fluid flows across the regulator valve 108, the formation of hydrates at the regulator valve 108 is reduced and/or prevented.

The stem 110 also controls the amount of flow of the hot fluid stream through the vortex tube valve 124 to provide for a maximum amount of heat transferred to the process fluid relative to a magnitude of a pressure drop of the process fluid at the regulator valve 108. In determining the amount of heat transferred to the process fluid relative to the magnitude of the pressure drop occurring at the regulator valve 108, the behavior of flow of the vortex in the vortex tube 118 is considered. In particular, the temperature difference of the hot fluid stream and the cold fluid stream with respect to the input fluid entering the vortex tube 118 and the flow of the vortex fluid through the vortex tube 118 may be represented by the example graph of FIG. 2. The graph of FIG. 2 shows temperature difference between an input fluid entering a vortex tube and a cold fluid stream and a hot fluid stream of the vortex versus a percentage of total flow of the cold fluid stream through a cold fluid outlet of the vortex tube.

Figure 2:
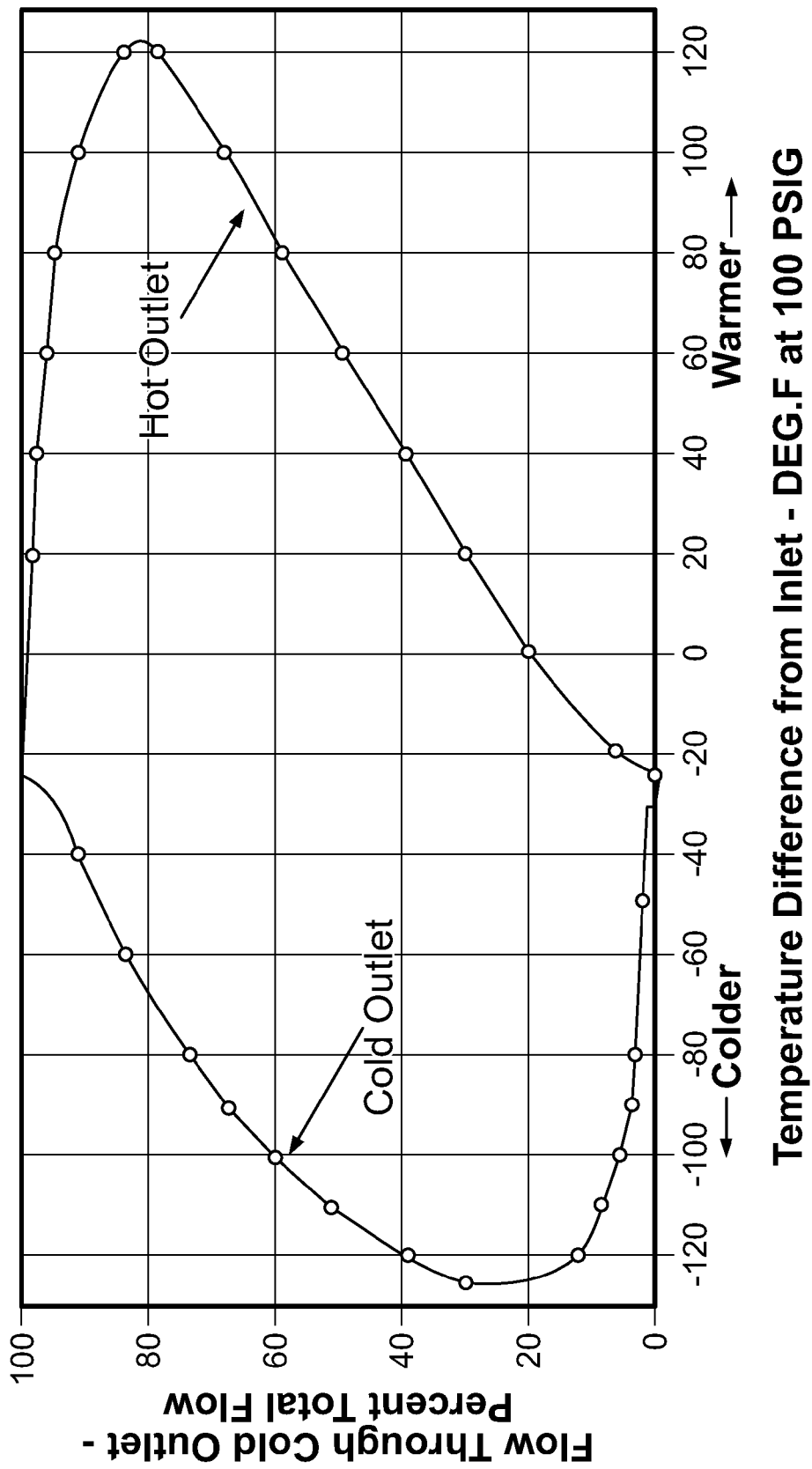
FIG. 2 is a graphical depiction of flow of a fluid through an example vortex generator versus a temperature difference between the fluid flowing through the vortex generator and an input fluid.

As shown in the graph of FIG. 2, an inverse relationship exists between the temperature of the hot fluid stream of the vortex and an amount of flow of the hot fluid stream exiting the vortex tube 118 via the hot fluid outlet 122. For example, when flow of the cold fluid stream through the cold outlet comprises about 80% of a total output flow and, thus, flow of the hot fluid stream through the hot outlet comprises about 20% of the total output flow, the temperature difference between the hot fluid stream and an input fluid is about 120° F. For the same flow, the temperature difference between the cold fluid stream and the input fluid is about −60° F.

The graph of FIG. 2 further shows that when flow of the cold fluid stream through the cold outlet comprises about 40% of the total output flow and, thus, the hot fluid stream comprises about 60% of the total flow, the temperature difference between the hot fluid stream and the input fluid is about 40° F. For the same flow, the temperature difference between the cold fluid stream and the input fluid is about −120° F. As represented by the graph of FIG. 2, increased temperature of the hot fluid stream corresponds to decreased output flow of the hot fluid stream through the vortex tube.

In the apparatus 100, when the vortex tube valve 124 is nearly closed and there is less flow of the hot fluid stream out of the hot fluid outlet 122 as compared to flow of the cold fluid stream out of the cold fluid outlet 126, the temperature of the hot fluid stream is increased in accordance with the behavior of the vortex tube shown in the graph of FIG. 2. As the stem 110 adjusts the regulator valve 108 in response to increased demand on the regulator 102, the stem 110 further adjusts the vortex tube valve 124 to provide increased heat to the regulator valve 108 to prevent icing that may result from the increased reduction of pressure occurring at the regulator valve 108.

For example, in response to increased demand on the regulator 102, the stem 110 opens the regulator valve 108 to increase flow of the process fluid through the regulator 102 and maintain a constant process fluid output pressure at the regulator outlet 112. As the process fluid flows across the regulator valve 108, pressure of the process fluid is reduced. As pressure of the process fluid is reduced, the risk of icing due to hydrates forming at the regulator valve 108 increases because of the increased drop in pressure.

To address the increased risk of icing, the stem 110 adjusts the vortex tube valve 124 to provide a maximum amount heat to the regulator valve 108 relative to the magnitude of the pressure drop occurring at the regulator valve 108. The stem 110 positions the vortex tube valve 124 so that flow of the hot fluid stream across the vortex tube valve 124 is less than the flow of the cold fluid stream exiting the vortex tube 118 via the cold fluid outlet 126. In such examples, the vortex tube valve 124 is in a partially or nearly closed position. As the flow of the process fluid through the regulator 102 increases due to the opening of the regulator valve 108, the flow of the hot fluid stream through the vortex tube valve 124 decreases due to the partial closing the vortex tube valve 124. As flow of the hot fluid stream decreases, the temperature of the hot fluid stream in the vortex tube 118 increases. The heat from the hot fluid stream is transferred to the process fluid in the regulator 102 as the hot fluid stream exits the vortex tube 118. In the example apparatus 100, the transfer of heat is accomplished via conduction at the area of contact 132.

The stem 110 controls the regulator valve 108 and the vortex tube valve 124 to balance flow of the process fluid through the regulator 102, the temperature of the hot fluid stream, and the amount of heat transferred to the regulator 102. In achieving such a balance, the stem 110 serves to maintain a constant regulator output pressure and to prevent the formation of hydrates in the regulator valve 108.

In some examples, the apparatus 100 includes insulation 136 disposed in the regulator body 104 and surrounding the vortex tube 118. The insulation 136 reduces the transmission (e.g., loss) of heat resulting from the generation of the vortex in the vortex tube 118 to environments other than the regulator 102. In some examples, the insulation includes a sound absorbing material that converts sound energy generated by the vortex in the vortex tube 118 to heat. The insulation 136 including a sound absorbing material may further surround the cold fluid outlet 126 to reduce noise as the cold fluid stream exits the tube 118. The insulation 136 is not limited to the apparatus 100 and may be included in the example apparatus disclosed herein.

In some examples, a plate 138 is disposed between the vortex tube valve 124 and the hot fluid outlet 122 to reduce noise resulting from generation of the vortex in the vortex tube 118. The plate 138 breaks down jets of the hot fluid stream exiting the vortex tube 118 via the hot fluid outlet 122. In some examples, the plate 138 is a perforated plate. In some examples, the sound-reducing plate 138 is additionally or alternatively disposed in the cold fluid outlet 126. The plate 138 is disposed in the hot fluid outlet 122 and/or the cold fluid outlet 126 to not plug the hot fluid outlet 122 and/or the cold fluid outlet 126.

Figure 3:
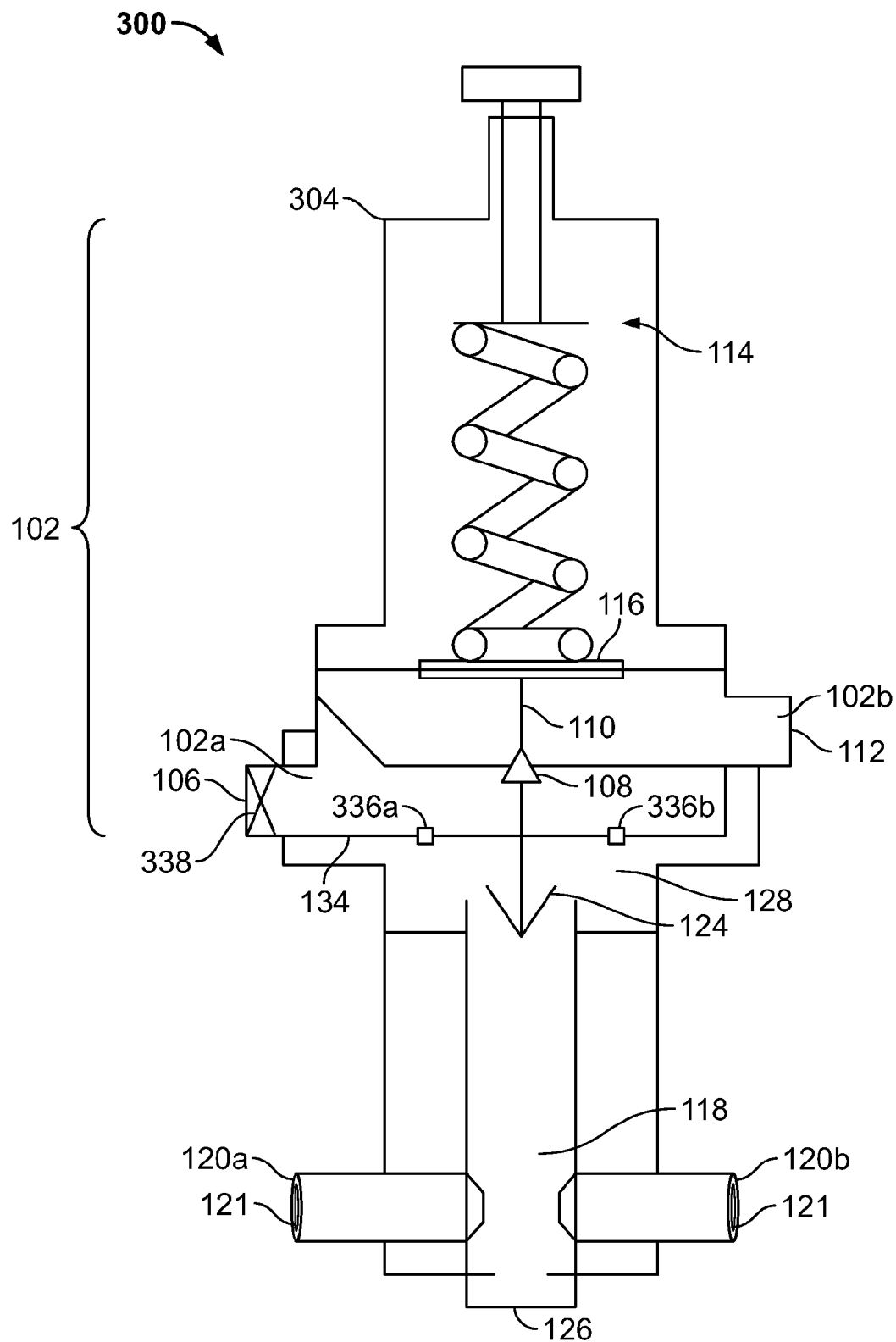
FIG. 3 is a schematic view of a second apparatus according to one or more aspects of the present disclosure.

FIG. 3 shows a second example apparatus 300 to provide heat to a regulator valve. The apparatus 300 includes the vortex tube 118 disposed in a regulator body 304. As an input fluid enters the vortex tube inlets 120*a*, 120*b* through the nozzles 121 and travels through the vortex tube 118, a vortex is generated including a relatively hot fluid stream and relatively cold fluid stream. The vortex tube valve 124 regulates a flow of the hot fluid stream exiting the vortex tube 118. The cold fluid stream exits the vortex tube 118 through the cold fluid outlet 126.

In the apparatus 300, the stem 110 controls the regulator valve 108 and the vortex tube valve 124. When the regulator valve 108 is open, for example, to increase flow of a process fluid through the regulator 102 to maintain a constant pressure output, the stem 110 positions the vortex tube valve 124 such that the hot fluid stream exits the vortex tube 118 and flows into the expansion chamber 128 disposed in the body 304 proximate to the surface 134 of the regulator 102. The surface 134 has channels 336*a*, 336*b* disposed therein and the hot fluid stream flows from the expansion chamber 128 through the channels 336*a*, 336*b* and into the first regulator chamber 102*a*. Heat from the hot fluid stream is transferred to the process fluid through mixing of the hot fluid stream with the process fluid in the first regulator chamber 102*a*. As the process fluid mixes with the hot fluid stream and flows across the regulator valve 108 to the second regulator chamber 102*b*, heat is provided to the regulator valve 108 to reduce and/or prevent the formation of hydrates.

To transfer a maximum amount of heat to the regulator valve 108 relative to the demand on the regulator 102, the stem 110 controls the vortex tube valve 124 in accordance with the behavior of the vortex tube 118 represented in the example graph of FIG. 2. For example, when the regulator valve 108 is open and flow of the process fluid through the regulator 102 is increased, the stem 110 partially closes the vortex tube valve 124 to provide heat to the regulator 102 via flow of the hot fluid stream through the channels 336*a*, 336*b*. The temperature difference between the input fluid and the hot fluid stream exiting the vortex tube 118 via the partially closed vortex tube valve 124 is maximized in response to increased pressure reduction of the process fluid at the regulator valve 108.

The apparatus 300 provides for heat transfer to the regulator 102 through mixing of the hot fluid stream with the process fluid in the regulator 102. To maximize an amount of heat transferred to the regulator 102, a restrictor 338, such as a restrictor valve, is disposed in the process fluid inlet 106. The restrictor 338 provides for a pressure drop as the process fluid enters the process fluid inlet 106 and flows into the first regulator chamber 102*a*. The restrictor 338 facilitates mixing of the hot fluid stream with the process fluid by reducing the pressure of the process fluid. In some instances, the pressure of the process fluid in the first regulator chamber 102*a* is higher than the pressure of the hot fluid stream exiting the vortex tube valve 124 and flowing through the channels 336*a*, 336*b*. The restrictor 338 provides for a pressure drop at the process fluid inlet 106 to reduce the pressure of the process fluid and facilitate mixing of the process fluid and the hot fluid stream. After flowing through the restrictor 338, the pressure of the process fluid in the first regulator chamber 102*a* is less than the pressure of the hot fluid stream after flowing through the vortex tube 118 and the channels 336*a*, 336*b*. Upon mixing the hot fluid stream with the process fluid, heat is provided to the regulator valve 108 as a mixture of the process fluid and the hot fluid stream flows across the regulator valve 108.

In some examples, the channels 336*a*, 336*b* comprise plates having holes therein. The hot fluid stream flows through the perforated plates and into the first regulator chamber 102*a*. The diameter of the plates forming the channels 336*a*, 336*b* is selected based on the magnitude of a pressure drop of the hot fluid stream as the hot fluid stream flows from the vortex tube 118 to the expansion chamber 128 via the vortex tube valve 124. The size of the channels 336*a*, 336*b* may be selected so that the hot fluid stream maintains a higher pressure than the process fluid as the hot fluid stream flows across the vortex tube valve 124, through the channels 336*a*, 336*b*, and into the first regulator chamber 102*a*. Further, although FIG. 3 shows the apparatus 300 having two channels 336*a*, 336*b*, the apparatus 300 may include additional or fewer channels.

Figure 4:
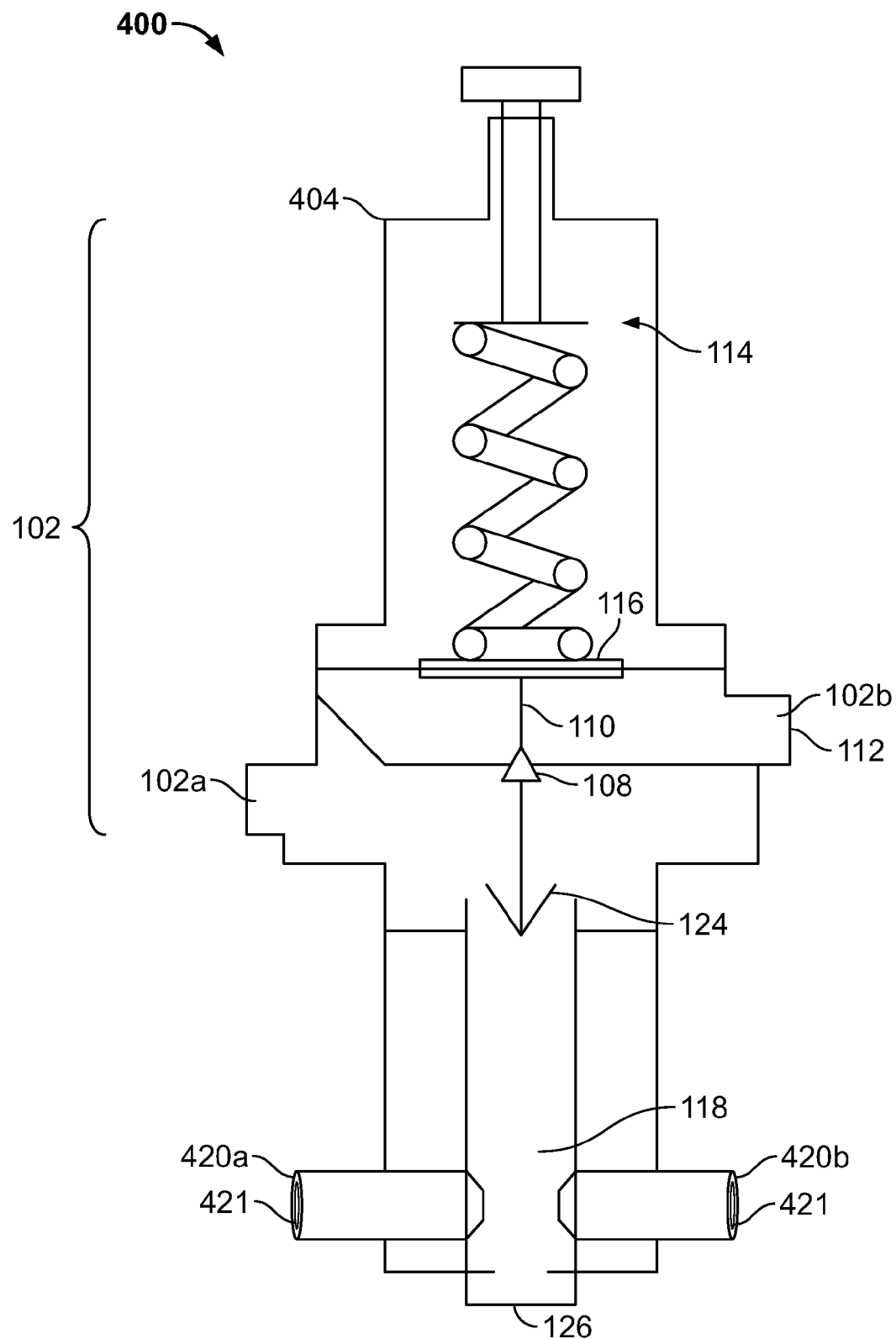
FIG. 4 is a schematic view of a third apparatus according to one or more aspects of the present disclosure.

FIG. 4 depicts a third example apparatus 400 for transferring heat to a regulator valve. The apparatus 400 includes the vortex tube 118 disposed in a regulator body 404. Vortex tube inlets 420*a*, 420*b* serve as inlets for a process fluid to the vortex tube 118 and the regulator 102 via a single flow path in the body 404. The process fluid enters the vortex tube inlets 420*a*, 420*b* through nozzles 421 and travels through the vortex tube 118 where a vortex is generated prior to the process fluid flowing into the first regulator chamber 102*a*. The vortex includes a relatively hot portion of the process fluid, or a hot process fluid stream, and a relatively cold portion of the process fluid, or a cold process fluid stream.

The vortex tube valve 124 controls a flow of the hot process fluid stream exiting the vortex tube 118. After exiting the vortex tube 118, the hot process fluid stream flows into the first regulator chamber 102*a*. During operation of the regulator 102, the hot process fluid stream flows across the regulator valve 108 to the second regulator chamber 102*b* and exits the apparatus 400 via the regulator outlet 112. In flowing through the vortex tube 118 prior to entering the regulator 102, the process fluid is heated as a result of the vortex generated in the vortex tube 118. The heat of the process fluid prevents instances of icing as fluid pressure is reduced at the regulator valve 108.

In the apparatus 400, the vortex tube inlets 420*a*, 420*b* serve as inlets for providing the process fluid to the vortex tube 118 and the regulator 102. The process fluid flows through the vortex tube 118 prior to entering the regulator 102. As a result, the stem 110 controls the vortex tube valve 124 to balance demand on the regulator 102 with an amount of heat transferred to the regulator 102. Specifically, the stem 110 controls the vortex tube valve 124 to provide for sufficient input of the hot process fluid stream to the regulator 102 to maintain a constant pressure output at the regulator outlet 112. In adjusting the vortex tube valve 124 to provide for sufficient input to the regulator 102, the stem 110 further controls the heat provided to the regulator 102 based on temperature and an amount of flow of the hot process fluid stream through the vortex tube valve 124.

The stem 110 balances a degree to which the vortex tube valve 124 is open to provide sufficient input to the regulator 102 with the temperature of the hot process fluid stream as it exits the vortex tube 118. In accordance with the behavior of the vortex output flow shown in the example graph of FIG. 2, the stem 110 positions the vortex tube valve 124 such that the temperature of the hot process fluid stream exiting the vortex tube valve 124 is maximized relative to the amount of flow of the process fluid required through the vortex tube valve 124 to maintain a constant output pressure at the regulator outlet 112. In the apparatus 400, the stem 110 controls the vortex tube valve 124 to provide sufficient input to the regulator 102 and sufficient heat to prevent the build-up of ice due to the reduction of the process fluid at the regulator valve 108.

Additionally, the stem 110 controls the regulator valve 108 and the vortex valve 124 to provide for staged pressure drops across the apparatus 400. The staged pressure drops increase stability of the apparatus 400 by reducing the magnitude of the pressure drop at the regulator valve 108 as the hot process fluid stream flows through the regulator 102. For example, as the stem 110 adjusts the vortex tube valve 124 to provide for adequate flow of the hot process fluid stream to the regulator 102, a first pressure drop occurs as the hot process fluid stream flows through the vortex tube valve 124 and into the first regulator chamber 102a. Upon entering the first regulator chamber 102a, the pressure of the hot process fluid stream is reduced due to the first pressure drop at the vortex tube valve 124. When the hot fluid stream flows across the regulator valve 108, a second pressure drop at the regulator valve 108 occurs. The magnitude of the second pressure drop is less than if the hot process fluid stream had not encountered the first pressure drop, as the pressure of the hot process fluid stream was reduced at the vortex tube valve 124 before flowing into the first regulator chamber 102a. The first pressure drop at the vortex tube valve 124 allows for smaller sizing of the loading mechanism 114 and the sensing element 116 to balance forces corresponding to the loading mechanism 114 and the process fluid. As a result, the stability of the apparatus 300 is increased due to the staged pressure drops at the two valve seats in the regulator body 404.

Figure 5:
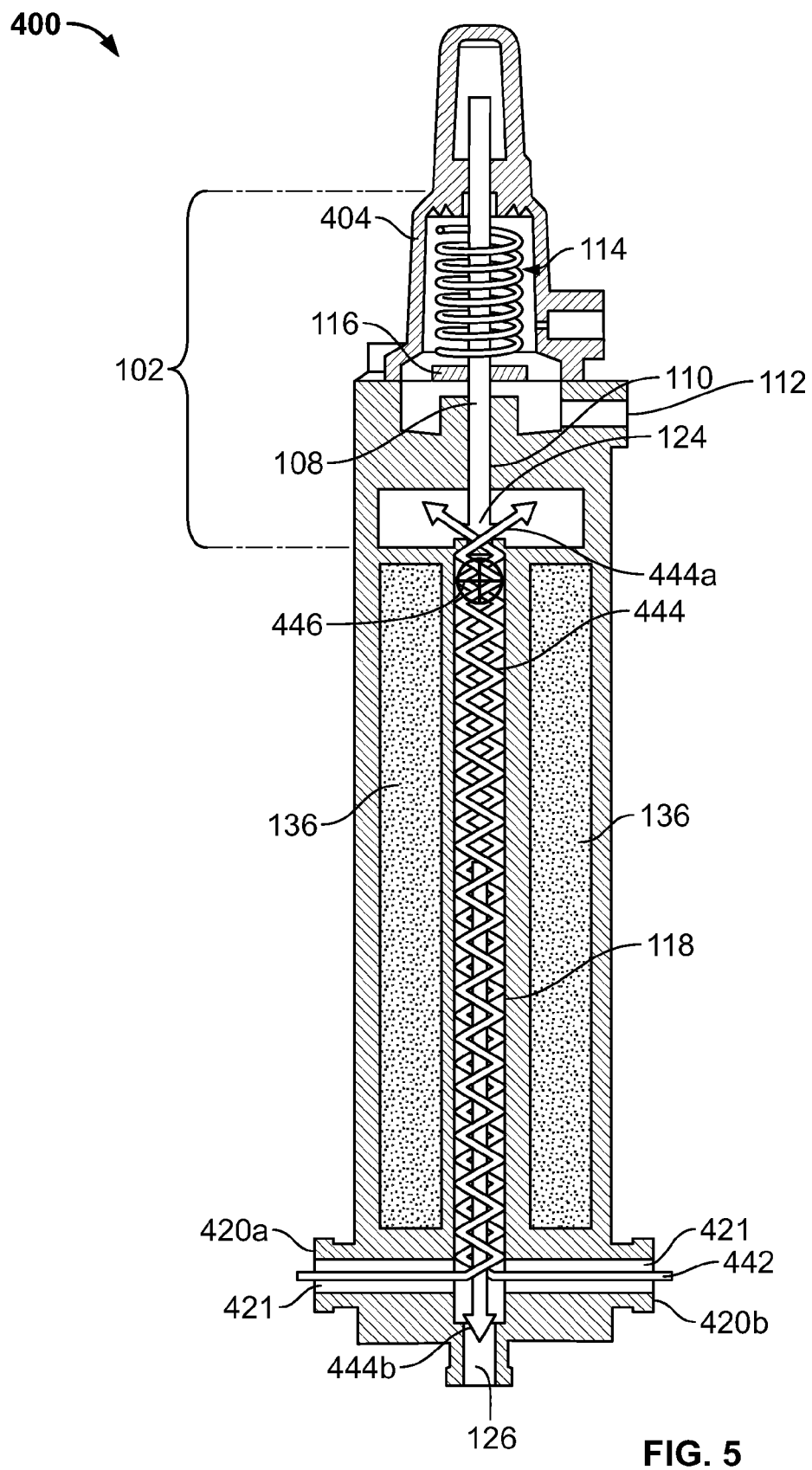
FIG. 5 is a cross-sectional view of the third apparatus of FIG. 4.

FIG. 5 is a second, more detailed operational view of the example apparatus 400. FIG. 5 shows the flow of an input process fluid 442 through the vortex tube 118 and the behavior of the stem 110. As the input process fluid 442 enters the vortex tube inlets 420a, 420b through the nozzles 421, a vortex 444 is generated. The vortex 444 includes a relatively hot process fluid stream 444a and a relatively cold process fluid stream 444b.

In the apparatus 400 depicted in FIG. 5, the stem 110 controls the opening and closing of the regulator valve 108 and the vortex tube valve 124 in response to demand on the regulator 102 to maintain pressure output and prevent icing. As demand on the regulator increases, the stem 110 opens the regulator valve 108. Further, the stem 110 positions the vortex tube valve 124 such that the temperature difference between the hot process fluid stream 444a and the input process fluid 442 is maximized relative to the amount of flow of the input process fluid 442 required through the apparatus 400 to maintain a constant pressure output at the regulator outlet 112.

As demand on the regulator 102 decreases, the stem 110 causes the regulator valve 108 to close. In such instances, the stem 110 moves the vortex tube valve 124 to a more fully open position such that the temperature difference between the hot process fluid stream 444a and the input process fluid 442 is less than when the vortex tube valve 124 is partially closed. During operation of the apparatus 400, the stem 110 continuously adjusts the regulator valve 108 and the vortex tube 124 based on the demand on the regulator 102.

In the apparatus 400, the cold fluid stream exits the tube 118 through the cold fluid outlet 126. In some examples, the cold fluid stream flows into, for example, pipes located downstream from the example apparatus 400. In some examples, the cold fluid stream 444b is air that is released to the atmosphere. Further, in the example apparatus 100 and 300, the cold fluid streams may additionally be captured or released upon exiting the cold fluid outlet 126 in the manner as described for the example apparatus 400.

In some examples, a detwister 446 is disposed in the vortex tube 118 proximate to the vortex tube valve 124. The detwister 446 straightens the hot process fluid stream 444a prior to the hot process fluid stream 444a flowing across the vortex tube valve 124. In straightening the hot process fluid stream 444a, the detwister 446 facilitates separation of the hot process fluid stream 444a from the cold process fluid stream 444b. In separating the hot process fluid stream 444a and the cold process fluid stream 444b, the detwister 446 provides for increased heat output as the hot process fluid stream 444a exits the vortex tube 118 through the vortex tube valve 124. The detwister 446 is not limited to the example apparatus 400 as shown in FIG. 5. The detwister 446 may also be implemented in the example apparatus 100 and the example apparatus 300. Other mechanisms for separating the hot process fluid stream 444a from the cold process fluid stream 444b may also be implemented in the example apparatus disclosed herein.

Figure 6:
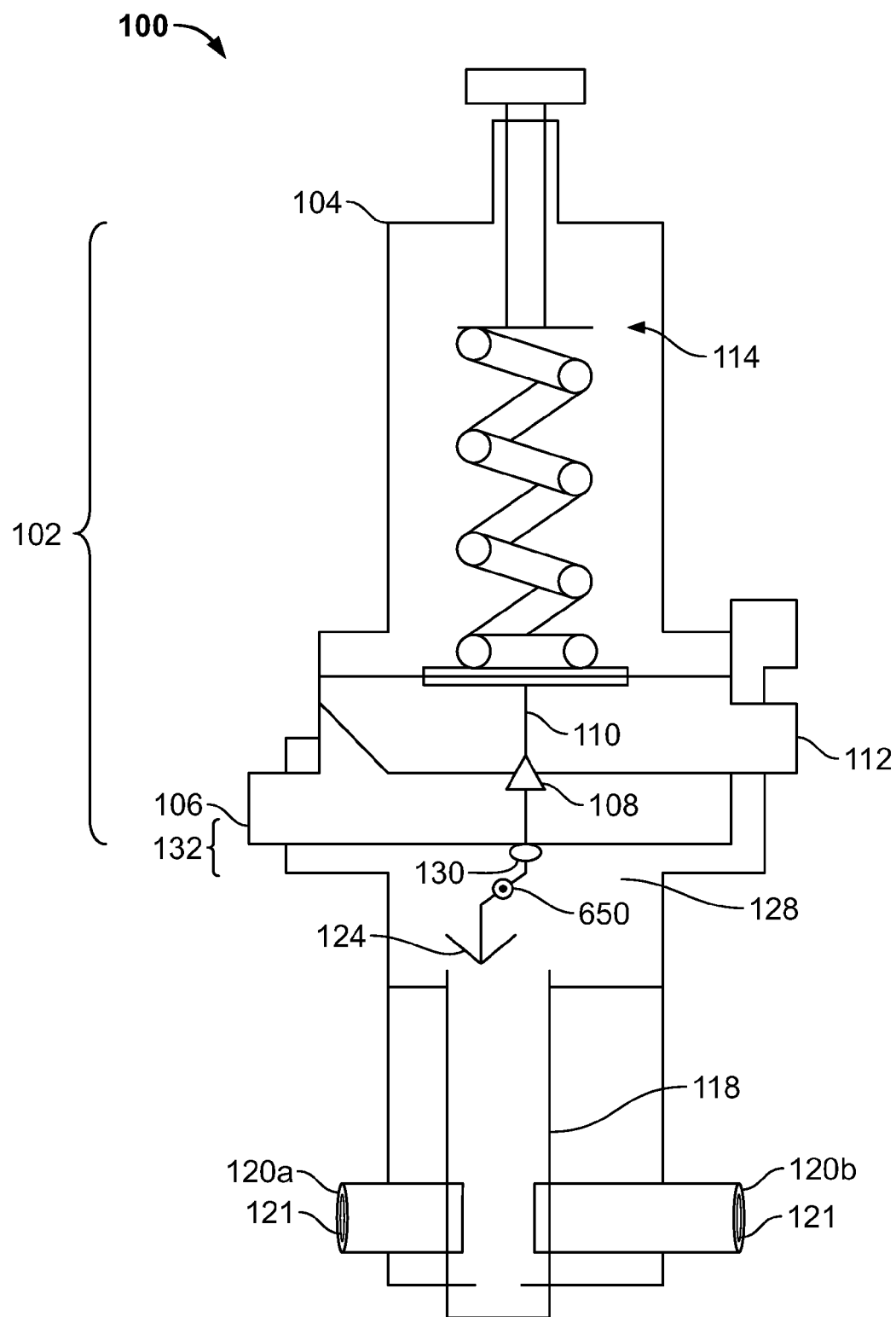
FIG. 6 is a schematic view of a fourth apparatus according to one or more aspects of the present disclosure.

FIG. 6 shows the example apparatus 100 having a lever 650 to control the vortex tube valve 124. The lever 650 is disposed in the regulator body 104 between the seal 130 and the vortex tube 118. The lever 650 is connected to the stem 110 such that the lever 650 adjusts the vortex tube valve 124 in response to the behavior of the stem 110 in adjusting the regulator valve 108 due to a force from the loading mechanism 114.

In the apparatus 100, the stem 110 opens the regulator valve 108 to provide for increased flow of the process fluid through the regulator 102 to maintain a constant pressure output at the regulator outlet 112. Concurrently, the lever 650 causes the vortex tube valve 124 to partially close to provide for the transfer of heat to the regulator valve 112 via the hot fluid stream of the vortex generated in the vortex tube 118. For example, heat may be transferred to the regulator 102 through conduction via the area of contact 132 between the regulator 102 and the expansion chamber 128.

In some examples, the position of vortex tube 118 in the regulator body 104 is offset relative to a position of the stem 110 and the seal 130. Offsetting the position of the vortex tube 118 accommodates motion of an arm of the lever 650 as the lever 650 controls the opening and closing of the vortex tube valve 124.

The lever 650 is not limited to the example apparatus 100 as shown in FIG. 6. Rather, the lever 650 may be implemented to provide for the transfer of heat to the regulator via the mixing of fluids as in the example apparatus 300 or via serial flow of the input fluid as in the example apparatus 400. Further, the lever 650 may be configured with the stem 110 in implementations other than the arrangement shown in FIG. 6.

From the foregoing, it will be appreciated that the above disclosed example apparatus include a regulator and vortex generator disposed in one body to regulate pressure and provide heat to reduce or prevent instances of icing at the point of pressure reduction in the regulator that may hinder the performance of the regulator. The examples disclosed above provide for the transfer of heat to the regulator without the need for external sources of heat and without temperature loss to the environment that may result from connecting external heat sources to the regulator. Heat is efficiently transferred to the regulator through, for example, conduction, fluid mixing, or serial flow of fluid through the vortex generator and the regulator. Further, the vortex generator does not require any other sources to generate heat other than a compressed fluid. In some examples, the compressed fluid provided to the vortex generator may be the same fluid that is output from the regulator.

Additionally, the examples apparatus disclosed herein maintain a constant output pressure at the regulator outlet. Further, the example apparatus disclosed above provide for a maximum amount of heat transferred to the regulator relative to the demand on the regulator and the magnitude of pressure reduction occurring at the regulator valve, which may correspond to an increased risk of icing. A two-seat, single stem valve stem allows for control of both the regulator and the vortex generator to provide for real-time adjustment with respect to the heat supplied to the regulator in response changes in flow through the regulator. It will be appreciated that the single stem balances an amount of flow through the regulator required to maintain a constant output pressure with an amount of heat transferred to the regulator to prevent icing resulting from pressure reduction of a fluid in the regulator.

Further, a staged pressure drop increases stability of the example apparatus disclosed herein by providing for a first pressure drop of a fluid as the fluid exits the vortex generator and flows to the regulator. The first pressure drop reduces the magnitude of the pressure drop of the fluid required at the regulator valve to maintain a constant regulator pressure output. The staged pressure drop allows for a smaller loading mechanism and sensing element to be used with the example apparatus without sacrificing stability of the regulator and while preventing the formation of hydrates that may impede regulator performance.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. An apparatus, comprising:
   a regulator including a body, a stem disposed therein, a first inlet and a first outlet, the regulator to regulate a pressure of a first fluid flowing from the first inlet to the first outlet; and
   a vortex generator disposed within the body and including a second inlet and a first valve, the vortex generator to convey heat to a second valve of the regulator via a second fluid flowing from the second inlet through the first valve, the stem to control the first valve and the second valve to regulate an amount of the heat conveyed to the second valve from the vortex generator via the first valve, the vortex generator to generate the heat prior to the second fluid flowing through the first valve, the second valve disposed in a first chamber between the first inlet and the first outlet and the first valve disposed in a second chamber between the second inlet and the first chamber.

2. The apparatus of claim 1, wherein a size of a contact area between the regulator and the vortex generator is associated with an amount of heat conveyed to the second valve.

3. The apparatus of claim 2, wherein the area of contact includes a surface of the regulator.

4. The apparatus of claim 3, wherein the heat is conveyed from the second chamber to the first chamber via the surface of the regulator.

5. The apparatus of claim 1, further comprising insulation to insulate the vortex generator from an ambient environment surrounding the body.

6. The apparatus of claim 1, wherein the second fluid is compressed fluid.

7. The apparatus of claim 6, wherein the body comprises a second outlet and a third outlet, the second outlet to convey a first portion of the compressed fluid away from the vortex generator and the third outlet to convey a second portion of the compressed fluid away from the vortex generator, the first portion of the compressed fluid having a higher temperature than the second portion of the compressed fluid.

8. The apparatus of claim 7, wherein the first valve is to control a flow of the first portion of the compressed fluid away from the vortex generator.

9. The apparatus of claim 8, further comprising a seal disposed between the first inlet and the first valve.

10. The apparatus of claim 8, further comprising a perforated plate disposed between the second outlet and the first valve to reduce the transmission of sound to the ambient environment.

11. The apparatus of claim 8, further comprising a lever disposed between the seal and the first valve to operate the first valve, wherein the stem is to control the lever.

12. The apparatus of claim 1, wherein the body includes a second outlet, a first portion of the second fluid to flow through the first valve and a second portion of the second fluid to flow through the second outlet, a temperature of the first fluid and a temperature of the first portion of the second fluid being higher than a temperature of the second portion of the second fluid flowing through the second outlet when the first valve and the second valve are in at least partially open positions.

13. An apparatus, comprising:
    a body having a first inlet and an outlet and a stem disposed therein, a first fluid to flow from the first inlet to the outlet;
    a vortex generator disposed within the body and having a second inlet, the vortex generator to heat a second fluid flowing from the second inlet to the outlet;
    a first valve to regulate pressure of the first fluid, the first valve disposed in a first chamber between the first inlet and the outlet; and
    a second valve disposed in the vortex generator, the second valve disposed in a second chamber between the second inlet and the first chamber, the stem to control the first valve and the second valve to regulate an amount of the second fluid flowing to the first valve from the vortex generator via the second valve to convey heat to the first valve, the vortex generator to heat the second fluid prior to the second fluid flowing through the second valve.

14. The apparatus of claim 13, further comprising a detwister disposed in the vortex generator.

15. The apparatus of claim 13, wherein a flow of the heated fluid through the second valve is associated with an amount of heat conveyed to the first valve.

16. The apparatus of claim 13, further comprising a restrictor disposed in the first inlet, the restrictor to reduce the pressure of the first fluid flowing through the first inlet.

17. The apparatus of claim 16, further comprising a channel to convey heated second fluid generated by the vortex generator to the first chamber.

18. The apparatus of claim 17, wherein the channel comprises a plate defining a hole therein.

19. The apparatus of claim 13, wherein the stem is to partially close the second valve when the first valve is open to convey the heat to the first valve.

20. An apparatus, comprising:
means for regulating pressure of a first fluid;
means for heating the means for regulating pressure, the means for heating to heat a second fluid, the means for regulating pressure and the means for heating comprising one body, the body including a first inlet for receiving the first fluid and a second inlet for receiving the second fluid; and
means for controlling the means for regulating pressure and the means for heating, the means for controlling to control an amount of heat conveyed from the means for heating to the means for regulating pressure via the second fluid, the means for heating to generate the heat before the means for controlling controls the amount of heat conveyed from the means for heating to the means for regulating pressure, the means for controlling including a first means for controlling the means for regulating pressure disposed in a first chamber in the body and a second means for controlling the means for heating disposed in a second chamber in the body, the first fluid to flow into the first chamber via the first inlet and the second fluid to flow into the second chamber via the second inlet.

21. The apparatus of claim 20, wherein the means for controlling is to cause the means for heating to respond proportionately to the means for regulating pressure.

* * * * *